United States Patent [19]
Chronister

[11] Patent Number: 5,170,988
[45] Date of Patent: Dec. 15, 1992

[54] INTERNAL TANK VALVE

[76] Inventor: Clyde H. Chronister, 6115 Bermuda Dunes, Houston, Tex. 77069

[21] Appl. No.: 878,689

[22] Filed: May 5, 1992

[51] Int. Cl.5 .............................................. F16K 51/00
[52] U.S. Cl. ................................... 251/144; 137/347; 251/293; 251/251
[58] Field of Search ....................... 251/144, 293, 251; 137/347, 350, 312

[56] References Cited

U.S. PATENT DOCUMENTS

| | | | |
|---|---|---|---|
| 1,498,726 | 6/1924 | Harris | 251/144 |
| 2,196,430 | 4/1940 | Sprenger | 251/144 |
| 2,553,991 | 5/1951 | Wagner et al. | 251/144 |
| 2,926,894 | 5/1960 | Dighton | 251/144 |
| 3,656,710 | 4/1972 | Shaw | 251/144 |
| 4,280,679 | 7/1981 | Shaw | 251/144 |
| 5,042,776 | 8/1991 | Chronister | 251/144 |

*Primary Examiner*—A. Michael Chambers
*Attorney, Agent, or Firm*—Fulbright & Jaworski

[57] ABSTRACT

An internal tank valve for a mobile tank car. The valve is a cam actuated, quick action cam and self-locking valve. A drive shaft actuates a cam roller which in turn controls the movement of a slide which moves a valve element transversely to a valve seat. The valve is controlled by a valve operator positioned inside of the tank and releasably connected to the valve.

10 Claims, 2 Drawing Sheets

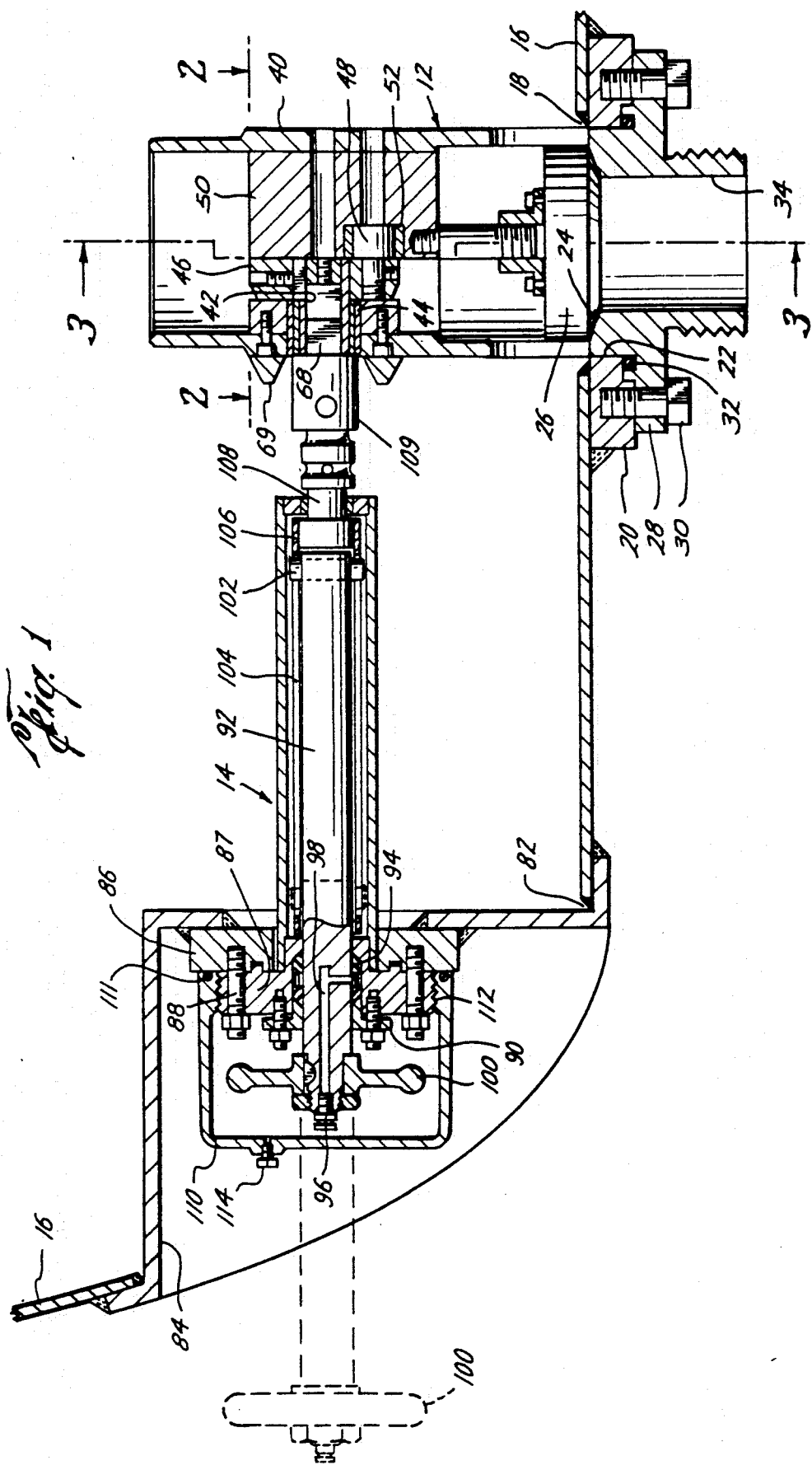

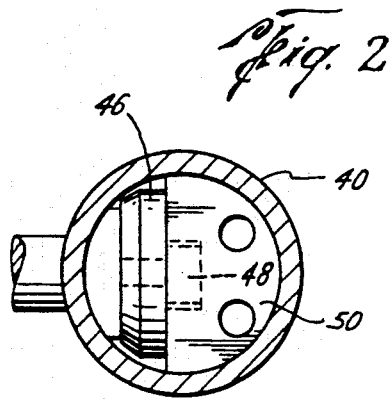
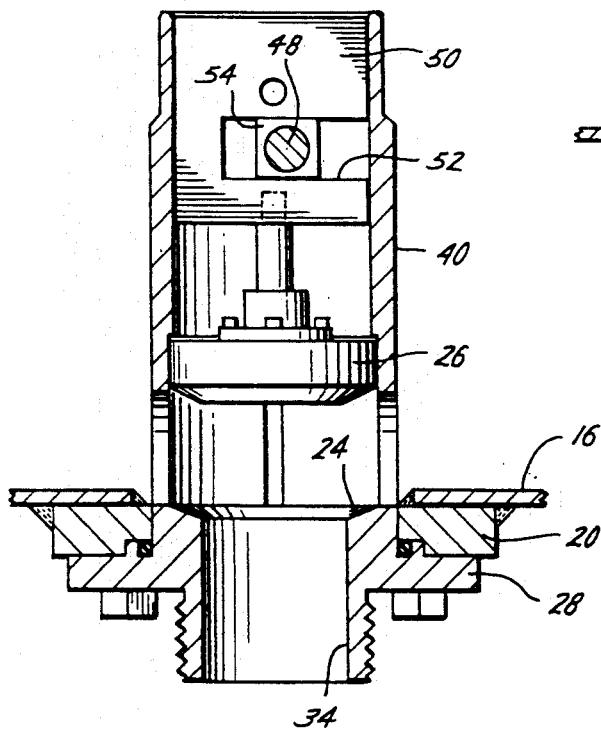

INTERNAL TANK VALVE

BACKGROUND OF THE INVENTION

The present invention is directed to a valve that can be used for unloading or loading tanks, for example, railroad tank cars and tank trucks.

It is known in my earlier U.S. Pat. No. 5,042,776 to provide a mobile tank with a tank valve and operator, both of which are positioned internally of the tank, and are therefore less subject to being damaged particularly if the tank is subjected to an accident.

The present invention is directed to an improved internal tank valve with improvements in the valve and operator to provide a quick acting and self-locking cam valve. In addition, an improved valve operator is provided which is simpler, less expensive and more easily repaired.

SUMMARY

The present invention is directed to an internal valve for a mobile tank car having an opening. A valve seat having a passageway is supported from the tank and positioned in the tank opening an a valve element support is connected to the valve seat and extends into the interior of the tank. A sealing valve element is positioned inside of the tank for moving transversely to and from and co-acting with the valve seat for opening and closing the passageway. A rotatable non-circular input shaft is supported from the valve element support and a cam roller is eccentrically connected to the rotatable input shaft. A slide is slidably movable in the valve element support in a direction perpendicular to the valve seat and the slide is connected to the sealing valve element. The slide includes a slot positioned transversely to the direction of movement of the slide and the cam roller is positioned in the slot for moving the slide and valve element towards and away from the valve seat as the input shaft is rotated. A valve operator is supported from the tank and extends to and is releasably connected to the input shaft. The valve operator is positioned inside the tank but exposed to the exterior of the tank.

Yet a still further object of the present invention is wherein the slot extends past the longitudinal axis of the valve element to provide a self-locking valve.

Still a further object of the present invention is wherein a cam mounting disk is connected between the input shaft and the cam roller. In addition, the slot may be a rectangle and includes a sliding block slidably movable in the slot and rotatably connected to the cam roller.

Still a further object of the present invention is wherein the valve operator includes an operator body connected to the tank, a stem drive telescopically extending through the body, a packing gland between the body and the stem drive and exposed to the exterior of the tank for adjustment, and a sealant groove in the stem drive extending between the packing gland and the exterior of the stem drive for inducing packing into the packing gland.

Yet a still further object is wherein the valve operator includes a safety cover releasably and sealably connected to the operator body and a vent plug in the safety cover.

Still a further object of the present invention is the provision of a valve operator including a drive tube connected to the input shaft in which the drive tube includes longitudinally extending slots, and said drive stem includes drive pins positioned in the slots whereby the drive stem may telescope relative to the drive tube.

Still a further object of the present invention is the provision of an internal valve for a mobile tank car having an opening and including a valve seat having a passageway supported from the tank and positioned in the tank opening with a valve element support connected to the valve seat and extending perpendicularly from the valve seat into the interior of the tank. A sealing valve element is positioned inside of the tank for moving transversely towards and away from and co-acting with the valve seat for opening and closing the passageway. A rotatable non-circular input shaft is supported from the valve element support and includes a longitudinal axis positioned perpendicular to the longitudinal axis of the valve element support. A cam roller is eccentrically connected to the rotatable input shaft and is positioned to rotate through the longitudinal axis of the valve element. A slide is slidably movable in the valve element support in a direction perpendicular to the valve seat and the valve slide is connected to the sealing valve element. The slide includes a rectangular slot transverse to the direction of movement of the slide. A sliding block is rotatably connected to the cam roller and is slidably movable in the slot for moving the slide and the valve element towards and away from the valve seat as the input shaft is rotated. A valve operator is connected to the input shaft and is positioned inside of the tank for operating the valve.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 1 is an elevational view, partly in cross-section, illustrating the present invention in use in a tank, FIG. 2 is a cross-sectional view taken along the line 2—2 of FIG. 1, FIG. 3 is a cross-sectional view taken along the line 3—3 of FIG. 1 and showing the valve in the closed position, and FIG. 3A is a view similar to FIG. 3, but showing the valve in an open position.

DESCRIPTION OF THE PREFERRED EMBODIMENT

Referring now to the drawings, the reference 10 generally indicates the internal tank valve of the present invention and generally includes a main valve generally indicated by the reference 12 and a valve operator generally indicated by the reference 14. The valve 10 is adapted to be installed inside of a mobile tank 16, for example a railroad tank car. However, the present internal valve 10 can be installed in other and various types of mobile tanks.

A hole 18 is cut in the tank 16, or an existing hole is used, large enough for the valve 12 to be installed. A tank flange 20 is welded to the exterior and interior of the tank 16 and provides a valve receiving hole 22 for allowing the insertion and removal of the valve 12. The valve 12 includes a valve seat 24 and a sealing valve disk element 26. A valve flange 28 connected to the valve seat 24 is attached to the tank flange 20 by plurality of studs 30 and a seal 32 is provided between the valve flange 28 and tank flange 20. The valve seat 24 also includes a passageway 34 having a suitable connection such as a threaded connection for connection to a conduit for supplying fluid to or from the tank 16. A valve element support 40 is connected to the valve seat 24 and extends perpendicularly from the valve seat 24 into the interior of the tank 16.

Referring now to FIG. 1, a rotatable non-circular drive shaft such as a sleeve 42 having a square interior is supported from the valve element support 40 and includes a longitudinal axis positioned perpendicular to the longitudinal axis of the valve support element 40 and of the valve element 26. The sleeve 42 is supported in a bearing 44. A cam roll mounting disk 46 is connected to the sleeve 42 and in turn is connected to a cam roller 48 which is thus eccentrically connected to the rotatable drive shaft 42 and positioned to rotate through the longitudinal axis of the valve support 40 and the longitudinal axis of the valve element 26. A vertically moving slide 50 is slidably movable in the valve element support 40 in a direction perpendicular to the valve seat 24. The slide 50 is connected to and supports the sealing valve element 26. The slide 50 includes a rectangular slot 52 which extends transversely to the direction of movement of the slide 50. A sliding block 54, such as a bronze square block is rotatably connected to the cam roller 48 and is slidably movable in the slot 52 for moving the slide 50 and thus the valve element 26 towards and away from the valve seat 24 as the drive shaft 42 is rotated.

It is to be noted that the slot 52 extends past the longitudinal axis 60 or centerline position of the valve support 14 and thus extends past the longitudinal axis of the valve element. Therefore, when the input shaft is rotated clockwise, as best seen in FIGS. 3 and 3A, the cam roller 48 is rotated clockwise moving the slide 50 downwardly to carry the valve element 26 into a seated position on the valve seat 24 thereby closing the valve 12. It is further noted that the slot 52 extends past the longitudinal axis 60 of the valve element 26 to provide a self-locking position holding the valve element 26 securely seated on the valve seat 24. By rotating the input shaft 42 in a counter clockwise position, the cam roller 48 rotates counter clockwise, moving the slide 50 upwardly carrying the valve element 26 upwardly thereby opening the passageway 34 for filling or emptying the tank 16.

Therefore, the cam actuated valve of the present invention provides a quick acting, approximately half turn actuation to provide a self-locking valve which reduces the possibility of the tank valve being opened due to shocks or vibration.

Referring now to FIG. 1, the improved valve operator 14 is shown which has fewer working parts, is not complicated, and which is less expensive. The valve operator 14 is installed in the tank 16 through an opening 82 and supported from a mounting flange 84 which may be welded to the exterior and interior of the tanks 16. An operator flange 86 is connected to mounting flange 84 such as by welding. After the valve 12 is installed in place through the opening 18, the operator 14 may be installed. It is noted that the longitudinal axis of the valve operator 14 is perpendicular to the longitudinal axis 60 of the valve 12 for allowing a square drive connector 68 to slidably engage and co-act with the square opening in the sleeve 42. A conical insertion guide 69 is provided to guide the square drive connector 68 into the hole of the sleeve 42.

An operator body 87 is threadably connected to the flange 86 by bolts 88 for insertion and removal of the valve operator 14 into and from the tank 16 for installation and repair. A packing gland 90 is provided between the valve body 87 and a drive stem 92 which telescopically and rotatably extends through the flange 87. The packing gland 90 receives packing 94 and the packing gland 90 can be adjusted from the exterior of the tank 16 if necessary. Additional packing can be transmitted through a sealant fitting 96 and sealant passageway 98 which is in communication with the packing 94 to force the packing tighter against the stem drive 92 to prevent any leakage. A hand wheel 100 is connected to the stem drive 92 for telescopically extending the stem drive 92 to the dotted position as shown and for rotating the stem drive 92 for actuating the valve 12.

Drive pins 102 are connected to the stem drive 92 and extend through longitudinal slots 104 in a drive tube 106 which in turn is connected through a shaft 108 to the square drive 68 through a flexible coupling such as a conventional joint 109.

Preferably a safety cover 110 is provided which is sealably and releasably connected to the flange 86 by seal 111 and threads 112 on the body 87. This safety cap 110 seals any leakage through the valve operator and prevents any leakage to atmosphere. A safety vent plug 114 is provided in the cover 110 for test purposes to determine if any of the product has accumulated inside of the safety cover 110.

In operation, openings 18 and 82 may be made in the tank 16, and the valve 12 is first installed. Thereafter, the operator 14 is installed with the square drive 68 slidably engaging the sleeve 42 in the support 40. It is noted that both the valve 12 and the operator 14 are positioned internally of the tank 16 and protected against accidental breakage. When it is desired to move the valve element 26 between an open and closed position, the cover 110 is removed, stem drive 92 is extended, the hand wheel 100 is rotated to move the valve element 26 to the desired position. Thereafter, the valve operator 14 is again placed in the retracted position.

The present invention, therefore, is well adapted to carry out the objects and attain the ends and advantages mentioned as well as others inherent therein. While a presently preferred embodiment of the invention has been given for the purpose of disclosure, numerous changes in the details of construction, will be readily apparent to those skilled in the art, and which are encompassed within the spirit of the invention and the scope of the appended claims.

What is claimed is:

1. An internal valve for a mobile tank car having an opening comprising, a valve seat having a passageway supported from the tank and positioned in the tank opening, a valve element support connected to the valve seat and extending into the interior of the tank, a sealing valve element positioned inside of the tank for moving transversely to and from and co-acting with the valve seat for opening and closing said passageway, a rotatable non-circular drive shaft supported from the valve element support, a cam roller eccentrically connected to the rotatable input shaft, a slide slidably movable in the valve element support in a direction perpendicular to the valve seat, said slide connected to and supporting the sealing valve element, said slide including a slot transverse to the direction of movement of the slide and said cam roller positioned in the slot for moving the valve element toward and away from the valve seat as the input shaft is rotated, and a valve operator supported from the tank and extending to and releasably connected to the input shaft, said operator positioned inside the tank but exposed to the exterior of the tank.

2. The valve of claim 1 wherein the slot extends past the longitudinal axis of the valve element.

3. The valve of claim 1 including a cam mounting disk connected between the drive shaft and the roller cam.

4. The valve of claim 1 wherein said slot is a rectangle and including a slidable block rotatably connected to the cam roller and slidably movable in the slot.

5. The valve of claim 4 wherein the slot extends past the longitudinal axis of the valve element.

6. The valve of claim 1 wherein the valve operator includes, an operator body connected to the tank, a stem drive telescopically extending through the body, a packing gland between the body and the stem drive and exposed to the exterior of the tank for adjustment, and a sealant groove in the stem drive extending between the packing gland and the exterior of the stem device.

7. The valve of claim 6 including a safety cover releasably and sealably connected to the operator body, and a vent plug in safety cover.

8. The valve of claim 6 wherein the valve operator includes, a drive tube connected to the input shaft, said drive tube including longitudinally extending slots and said stem drive including drive pins positioned in the slots whereby the stem drive may telescope relative to the drive tube.

9. An internal valve for a mobile tank car having an opening comprising, a valve seat having a passageway supported from the tank and positioned in the tank opening, a valve element support connected to the valve seat and extending perpendicularly from the valve seat and into the interior of the tank, a sealing valve element positioned inside of the tank for moving transversely toward and away from and co-acting with the valve seat for opening and closing said passageway, a rotatable non-circular drive shaft supported from the valve element support and having a longitudinal axis positioned perpendicularly to the longitudinal axis of the valve element, a cam roller eccentrically connected to the rotatable drive shaft and positioned to rotate through the longitudinal axis of the valve element, a slide slidably movable in the valve element support in a direction perpendicular to the valve seat, said slide connected to and supporting the sealing valve element, said slide including a rectangular slot transverse to the direction of movement of the slide, a sliding block rotatably connected to the cam roller and slidably movable in the slot for moving the valve element toward and away from the valve seat as the drive shaft is rotated, and a valve operator supported from the tank and extending to and releasably connected to the input shaft, said operator positioned inside the tank but exposed to the exterior of the tank.

10. The valve of claim 9 wherein the slot extends past the longitudinal axis of the valve element.

* * * * *